US006304406B1

(12) United States Patent
Douglas et al.

(10) Patent No.: US 6,304,406 B1
(45) Date of Patent: Oct. 16, 2001

(54) ROTATIONAL VIBRATION COMPENSATION USING A FIXED HEAD AND A CONSTANT FREQUENCY PATTERN

(75) Inventors: D Brent Douglas; Lealon R. McKenzie; Nathaniel B. Wilson, all of Edmond; Stuart K. Francis; Arthur J. Clark, both of Oklahoma City, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/216,326

(22) Filed: Dec. 18, 1998

Related U.S. Application Data (60) Provisional application No. 60/088,079, filed on Jun. 5, 1998, and provisional application No. 60/088,316, filed on Jun. 5, 1998.

(51) Int. Cl.$^7$ .................................................. G11B 15/46
(52) U.S. Cl. ....................................... 360/73.03; 360/73.01
(58) Field of Search ............................... 360/73.01, 73.02, 360/73.03, 75

(56) References Cited

U.S. PATENT DOCUMENTS

| | | |
|---|---|---|
| 4,040,103 | 8/1977 | White . |
| 4,297,734 | 10/1981 | Laishley et al. . |
| 4,692,915 | 9/1987 | Moriya et al. . |
| 4,799,112 | 1/1989 | Bremmer . |
| 4,907,105 | * 3/1990 | Kurzweil, Jr. .................... 360/73.02 |
| 4,914,644 | 4/1990 | Chen et al. . |
| 4,947,093 | 8/1990 | Dunstan et al. . |
| 5,036,506 | 7/1991 | Bierhoff . |
| 5,235,472 | 8/1993 | Smith . |
| 5,251,484 | 10/1993 | Mastache . |
| 5,254,920 | 10/1993 | Agarwal et al. . |
| 5,299,075 | 3/1994 | Hanks . |
| 5,426,545 | 6/1995 | Sidman et al. . |
| 5,452,612 | 9/1995 | Smith et al. . |
| 5,633,570 | * 5/1997 | Motzko ................................. 318/439 |
| 5,654,840 | 8/1997 | Patton et al. . |
| 5,663,847 | 9/1997 | Abramovitch . |

FOREIGN PATENT DOCUMENTS

| | | |
|---|---|---|
| 0 264 535 A2 | 4/1988 | (EP) . |
| 0 306 715 A1 | 3/1989 | (EP) . |
| 0 658 894 A1 | 6/1995 | (EP) . |
| 0 675 365 A2 | 10/1995 | (EP) . |
| 2 011 654 A | 7/1979 | (GB) . |
| 401315071A | * 12/1989 | (JP) ........................................ 360/51 |

OTHER PUBLICATIONS

White and Tomizuka, "Increased Disturbance Rejection in Magnetic Disk Drives by Acceleration Feedforward Control," Department of Mechanical Engineering, University of California, Berkeley, CA 94720–1740, 13$^{th}$ Triennial World-Congress, San Francisco, USA, 1996.

Abramovitch, "Rejecting Rotational Disturbances on Small Disk Drives Using Rotational Accelerometers," Storage Technologies Department, Hewlett–Parkard Laboratories, Alto, CA 94304–1126, 13$^{th}$ Triennial World Congress, San Francisco, USA, 1996.

* cited by examiner

Primary Examiner—Regina Y. Neal
(74) Attorney, Agent, or Firm—Crowe & Dunlevy (57) ABSTRACT

An apparatus and method for minimizing the effects of rotational vibration upon a disc drive having a base deck supporting a rotatable disc and an actuator having a moveable data head. A fixed head is supported over the disc at a predetermined radius and transduces a circumferentially extending frequency pattern written to the disc at a constant frequency to generate a readback signal. A frequency modulation (FM) demodulator generates a rotational velocity signal indicative of application of rotational vibration to the base deck in relation to changes in frequency of the readback signal. A servo circuit controllably positions the moveable data head in response to the rotational velocity signal and servo information readback by the moveable data head. The servo circuit interrupts a data transfer operation between the moveable data head and a host device when a magnitude of the rotational velocity signal exceeds a predetermined threshold. The circumferentially extending frequency pattern is preferably used to clock the writing of the servo information during disc drive manufacturing.

19 Claims, 7 Drawing Sheets

ROTATIONAL VIBRATION COMPENSATION USING A FIXED HEAD AND A CONSTANT FREQUENCY PATTERN

RELATED APPLICATIONS

This application claims priority to U.S. Provisional Application No. 60/088,079 entitled MEASURING AND CANCELING ROTATIONAL VIBRATION IN A DISK DRIVE USING A DEDICATED HEAD WITHOUT USING A DEDICATED SURFACE, filed Jun. 5, 1998, and is related to the following copending, concurrently filed U.S. Patent Applications: application Ser. No. 09215470 entitled ROTATIONAL VIBRATION COMPENSATION USING A DEDICATED SURFACE WITH A CONSTANT FREQUENCY PATTERN and Application No. 60/216,322 entitled ROTATIONAL VIBRATION COMPENSATION USING AN OPTICAL VELOCITY SENSOR also claims benefit of Provisional application No. 60/088,316, filed Jun. 5, 1998.

FIELD OF THE INVENTION

This invention relates generally to the field of disc drive storage devices, and more particularly, but not by way of limitation, to improving data transfer performance of a disc drive by detecting and compensating rotational vibration using a fixed head to demodulate a frequency pattern written to a disc recording surface at a constant frequency.

BACKGROUND OF THE INVENTION

Disc drives are digital data storage devices which enable users of computer systems to store and retrieve large amounts of data in a fast and efficient manner. Disc drives of the present generation have data storage capacities in excess of several gigabytes (GB) and can transfer data at sustained rates of several megabytes (MB) per second.

A typical disc drive is provided with a plurality of magnetic recording discs which are mounted to a rotatable hub of a spindle motor for rotation at a constant, high speed. An array of read/write heads are disposed adjacent surfaces of the discs to transfer data between the discs and a host computer. The heads are radially positioned over the discs by a closed loop, digital servo system, and are caused to fly proximate the surfaces of the discs upon air bearings established by air currents set up by the high speed rotation of the discs.

A plurality of nominally concentric tracks are defined on each disc surface. A preamp and driver circuit generates write currents that are used by the head to selectively magnetize the tracks during a data write operation and amplifies read signals detected by the head during a data read operation. A read/write channel and interface circuit are operably connected to the preamp and driver circuit to transfer the data between the discs and the host computer.

A rigid housing is provided to support the spindle motor and the actuator, with the housing cooperating with a top cover to form an internal controlled environment to minimize particulate contamination of the discs and heads. A printed circuit board is mounted adjacent an exterior surface of the housing to accommodate various disc drive control electronics, including the aforementioned servo circuit, read/write channel and interface circuit.

Disc drives are often used in a stand-alone fashion, such as in a typical personal computer (PC) or portable data processing/communication device where a single disc drive is utilized as the primary data storage peripheral. However, in applications requiring vast amounts of data storage capacity or high input/output (I/O) bandwidth, a plurality of drives are often arranged into a multi-drive array, sometimes referred to as a RAID ("Redundant Array of Inexpensive Discs"; also "Redundant Array of Independent Discs"). A seminal article proposing various RAID architectures was published in 1987 by Patterson et al., entitled "A Case for Redundant Arrays of Inexpensive Discs (RAID)", Report No. UCB/CSD 87/391, December 1987, Computer Science Division (EECS), University of California, Berkeley, Calif.

Since their introduction, RAIDs have found widespread use in a variety of applications requiring significant data transfer and storage capacities. It is presently common to incorporate several tens, if not hundreds, of drives into a single RAID. While advantageously facilitating generation of large scale data storage systems, though, the coupling of multiple drives within the same enclosure can also undesirably increase the effects of vibrations from excitation sources within the drives, such as spindle motors used to rotate the discs and actuators used to move the heads to various tracks on the discs. Such vibrations can be transmitted from drive to drive through chassis mounts used to secure the drives within the enclosure.

Vibrational components can be characterized as being either translational or rotational in nature. Translational vibrations tend to move a disc drive housing back and forth along a plane of the drive, whereas rotational vibrations tend to rotate a disc drive housing about an axis normal to a plane of the drive. Translational vibrations will generally have little effect upon the ability of the actuator to maintain the heads at a selected position with respect to the discs, as the discs and the actuator will both respond to the movement induced by such translational vibrations. However, such is not true with rotational vibrations.

Even with a nominally balanced actuator, rotational vibrations will tend to move the discs relative to the actuator because the actuator, acting as a free body, remains essentially undisturbed due to inertial effects while the discs, mounted to the housing, are displaced by imparted rotational vibration. When sufficiently severe, such movement can cause an "off-track" condition whereby a head is moved away from a selected track being followed. As will be recognized, an off-track condition can adversely affect the ability of the drive to transfer data between the discs and host device.

The problems associated with rotational vibrations are well known in the disc drive art. Compensation attempts have included use of sensors that can detect the presence of rotational vibration in a disc drive, such as discussed in U.S. Pat. No. 5,235,472 issued Aug. 10, 1993 to Smith, assigned to the assignee of the present invention. Efforts to both detect and compensate rotational vibration using feedforward control include discussions by White and Tomizuka, "Increased Disturbance Rejection in Magnetic Disk Drives by Acceleration Feedforward Control," and Abramovitch, "Rejecting Rotational Disturbances on Small Disk Drives Using Rotational Accelerometers." Both of these papers were presented at the 13$^{th}$ Triennial World Congress, San Francisco, U.S.A., 1996.

While operative, there are limitations with these and other prior art approaches to minimizing the effects of rotational vibration in a disc drive. Sensors that specifically detect rotational vibration are commercially available, but are often prohibitively expensive for use in low cost disc drive designs and require active testing in a test bed to properly calibrate. Such sensors may include a piezoelectric polymer film disposed between metallic layers that detects rotational vibration in response to torsion induced on the film, as disclosed by the aforementioned Smith U.S. Pat. No. 5,235,472; another construction uses multiple piezoelectric transducers within a single component enclosure to detect rotation in relation to differences in detected motion among the transducers.

Alternatively, rotational sensors can be formed from two or more linear accelerometers which detect rotational vibration in response to differences in the detected motion between the devices. While potentially less expensive to implement than an integrated rotational sensor, commercially available discrete linear accelerometers (piezo or similar construction) can have significant part-to-part output gain variation characteristics, making such unsuitable for use in a drive to detect rotational vibration without special screening and laser trimming operations to obtain matched sets of accelerometers.

By way of example, the aforementioned White et al. and Abramovitch references are illustrative of conventional approaches requiring use of relatively precise (and therefore expensive) accelerometers, as well as a calibration routine requiring use of a shaker table to impart vibrations of known characteristics. Such considerations make these approaches undesirable for high volume disc drive manufacturing, and prevent future adaptation of the response characteristics of a given drive to its subsequent field environment.

These references are also limited to compensating for rotational effects and do not directly address translational effects. Significantly, though, translational effects have also been found to contribute to off-track errors due to actuator imbalance (i.e., dynamic imbalance about the actuator rotational axis) and non-zero actuator bearing frictional forces. In practice, induced vibration is seldom purely rotational or translational, but rather usually includes a combination of both.

Moreover, the movement of a track relative to a head as a result of the application of rotational vibration will typically comprise both radially directed acceleration (i.e., along a radius of the discs) and tangentially directed acceleration (i.e., with respect to the axis of disc rotation). The radially directed acceleration component will tend to shift the location (axis) in space about which the discs rotate, whereas the tangentially directed acceleration will tend to change the rotational speed of the discs. The foregoing references accordingly only detect the radially directed acceleration components of a rotational vibration event, and ignore these tangentially directed acceleration effects.

Accordingly, as disc drive track densities and performance requirements continue to increase, there remains a continual need for improved approaches in the art to compensating for the effects of vibration in a disc drive using inexpensive and easily configured vibration sensor circuitry.

SUMMARY OF THE INVENTION

The present invention provides an apparatus and method for minimizing the effects of rotational vibration on a disc drive.

As exemplified by presently preferred embodiments, the disc drive the disc drive includes a base deck supporting a rotatable disc and an actuator having a moveable data head.

A fixed head is additionally provided and supported over the disc at a predetermined radius of the disc, with the fixed head generating a readback signal from a circumferentially extending frequency pattern written to the disc at a constant frequency. An FM demodulator generates a rotational velocity signal indicative of application of rotational vibration to the base deck in relation to changes in frequency of the readback signal from the fixed head induced by changes in rotational speed of the disc. A servo circuit controllably positions the moveable data head in response to servo information stored on the disc and the rotational velocity signal from the FM demodulator.

The servo circuit further interrupts a data transfer operation between the moveable data head and a host device when a magnitude of the rotational velocity signal exceeds a predetermined threshold.

In a preferred embodiment, the disc further comprises a landing zone on which the moveable data head is brought to rest when the disc drive is deactivated, wherein the circumferentially extending frequency pattern is written to the landing zone, and the fixed head is supported over the landing zone. Additionally, the circumferentially extending frequency pattern is preferably used to clock the writing of the servo information during manufacturing, eliminating the need to insert and position an external clock head into the disc drive for this purpose.

These and various other features and advantages which characterize the present invention will be apparent from a reading of the following detailed description and a review of the associated drawings.

DETAILED DESCRIPTION

Figure 1:
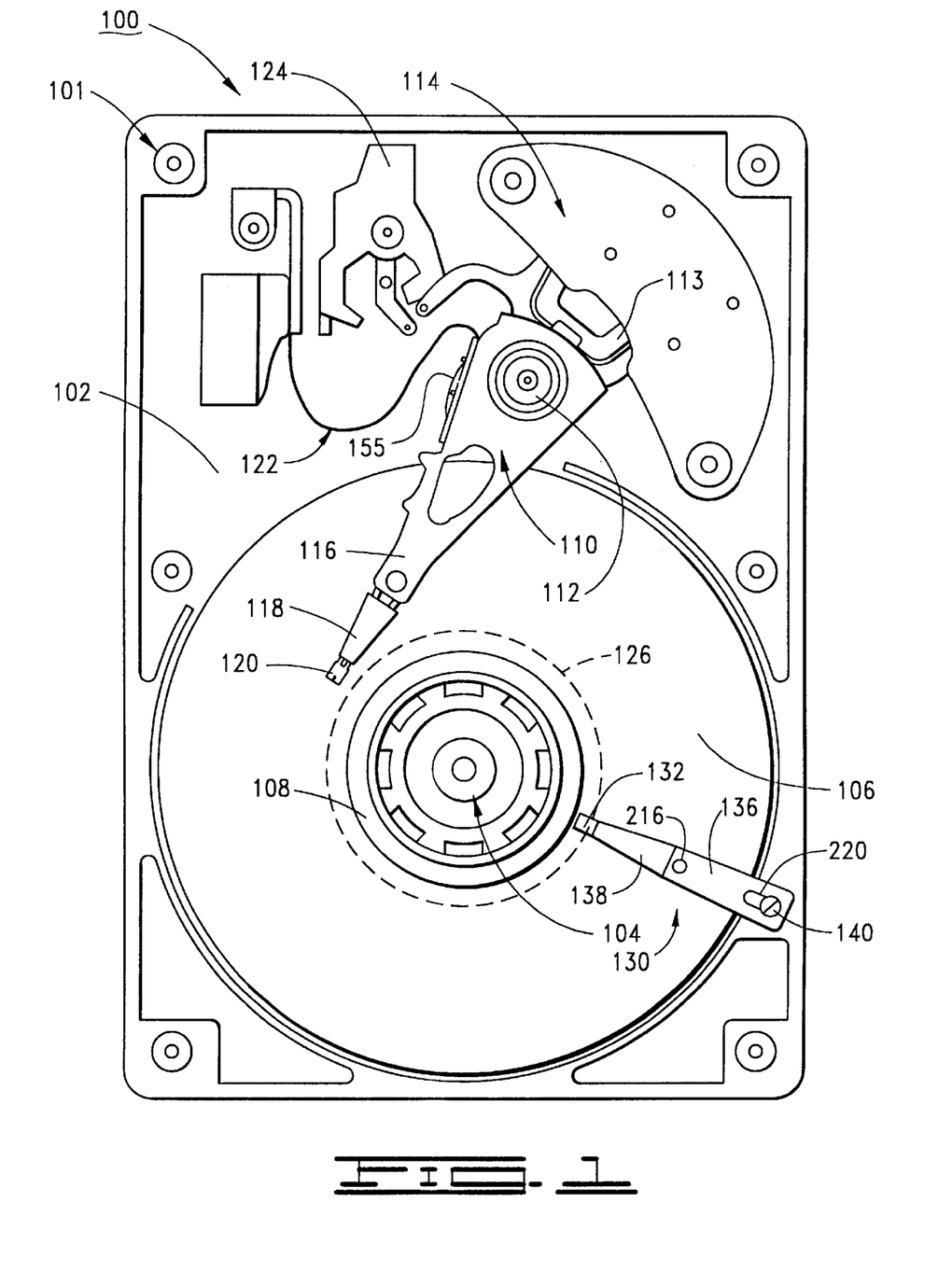
FIG. 1 provides a top plan view of a disc drive constructed in accordance with preferred embodiments of the present invention.

In order to set forth a detailed description of various presently preferred embodiments of the present invention, reference is first made to FIG. 1 which shows a top plan view of a disc drive 100 used to store computer data. The disc drive 100 includes a head-disc assembly (HDA) 101 and a printed wiring assembly (PWA) which is mounted to the underside of the HDA and is thus not visible in FIG. 1. The PWA includes electronics used to control the operation of the HDA 101, as discussed below.

A top cover, omitted from FIG. 1 to reveal interior portions of the HDA 101, mates with a base deck 102 to provide an environmentally controlled environment. A spindle motor (generally designated at 104) is supported by the base deck 102 and rotates a plurality of axially aligned discs 106 at a constant high speed. A disc clamp 108 secures the discs to the spindle motor 104 in a conventional manner.

The discs include recording surfaces (not separately identified in FIG. 1) to which user data are written by way of a rotary actuator 110, which rotates about a cartridge bearing assembly 112 in response to the application of current to a coil (113, a portion of which is visible in FIG. 1) of a voice coil motor (VCM) 114. The actuator 110 includes a plurality of rigid arms 116, each of which supports a corresponding flexible suspension assembly 118. Each suspension assembly 118 in turn supports a head 120 over each of the respective recording surfaces of the discs 106 by an air bearing established by air currents set up by the high speed rotation of the discs 106. It will be noted that the suspension assemblies 118 provide spring forces which urge the heads 120 toward the respective disc surfaces, and the heads 120 are provided with aerodynamic features that fly the heads 120 over the disc surfaces in a highly stable manner.

The heads are preferably characterized as magneto-resistive (MR) heads, each having a thin film inductive write element and an MR read element. For reference, the heads 120 are also sometimes referred to herein as both "data heads" and "moveable data heads."

A flex circuit assembly 122 facilitates electrical interconnection between the actuator 110 and the disc drive PWA. A latch 124 secures the actuator 110 when the disc drive 100 is deactivated, allowing the data heads 120 to safely come to rest upon landing zones 126 located at the innermost radii of the discs 106. The landing zones 126 are preferably texturized to prevent stiction forces from undesirably adhering the data heads 120 to the landing zones 126.

In accordance with conventional practices, during a disc drive shutdown operation the actuator 110 is rotated so as to fly the heads 120 over the landing zones 126 (and the latch 124 is activated) before the rotational speed of the discs 106 falls to a level below which the data heads 120 can be supported over the surfaces of the discs; as the rotational speed of the discs 106 decreases, the data heads 120 come to rest upon the landing zones 126. When the disc drive is thereafter activated, the data heads 120 begin to fly over the landing zones 126 when the rotational speed of the discs 106 is increased sufficiently to support the data heads 120; once the discs 106 reach operational speed, the latch 124 is deactivated and the data heads 120 are moved out over the disc surfaces.

FIG. 1 additionally shows a rotational vibration sense assembly 130, which supports a fixed head 132 over the landing zone 126 of the top disc 106. More particularly, the sense assembly 130 comprises a rigid arm 136 and a flexible suspension assembly 138, with the fixed head 132 supported at a distal end of the flexible suspension assembly 138. As with the suspension assemblies 118 discussed above, the suspension assembly 138 also exerts a spring force upon the fixed head 132 to bias the fixed head 132 toward the top disc 106. Hence, the fixed head 132 is caused to fly over the landing zone 126 of the top disc 106 when the discs 106 are rotated, and comes to rest against the landing zone 126 when the rotation of the discs 106 is ceased. The rigid arm 136 is affixed to the base deck 102 using a suitable fastener 140. Head wires (not shown) are routed from the fixed head 132 to the disc drive PWA to facilitate electrical interconnection therebetween.

Generally, the sense assembly 130 is provided to sense the application of rotational vibration to the disc drive 100. In a manner to be discussed in detail below, the landing zone 126 of the top disc 106 is provided with a circumferentially extending frequency pattern that is written at a constant frequency by a write element of the fixed head 132. This frequency pattern is thereafter read by a read element of the fixed head 132, with changes in the frequency of the readback signal being used to detect the presence and magnitude of rotational vibration applied to the base deck 102.

Figure 2:
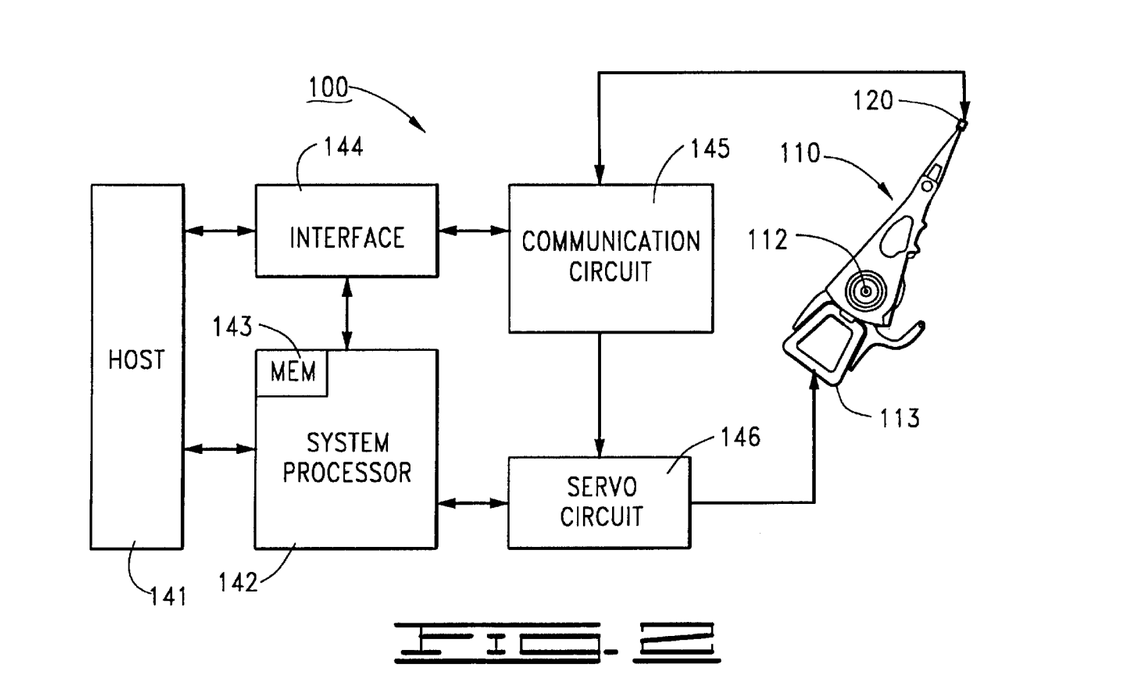
FIG. 2 provides a functional block diagram of relevant portions of the disc drive of FIG. 1.
Figure 3:
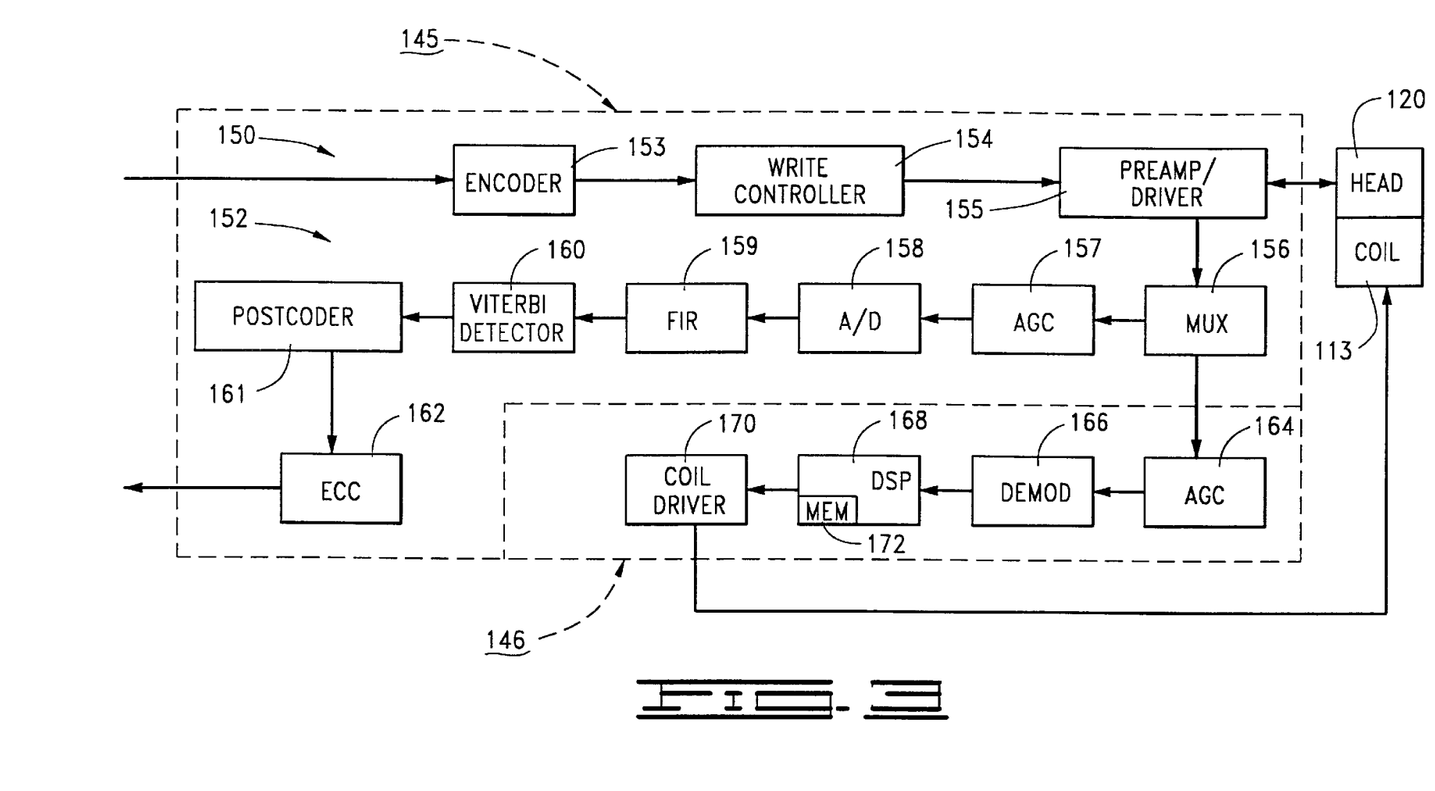
FIG. 3 shows a functional block diagram for the communication channel and servo circuit of FIG. 2.

At this point, however, it will be helpful to briefly review additional aspects of the disc drive 100 and FIGS. 2 and 3 have been provided for this purpose. Referring to FIG. 2, shown therein is a generalized functional block diagram of the disc drive 100 and includes circuitry disposed on the aforementioned disc drive PWA. The disc drive 100 is shown in FIG. 2 to be operably coupled to a host device 141 (such as a personal computer) with which the disc drive 100 is associated.

A system processor 142 of the disc drive 100 provides top level drive operational control. Programming and parameter values utilized by the system processor 142 are stored in drive processor memory 143 (MEM), which preferably comprises both volatile and non-volatile memory devices such as dynamic random access memory (DRAM) and flash memory. An interface circuit 144 includes a data buffer (not separately shown) for the temporary buffering of transferred data, and a sequence controller ("sequencer", also not separately shown) which directs the operation of the disc drive 100 during data transfer operations.

FIG. 2 further shows a communication circuit 145 operably coupled to the interface circuit 144 and to the head 120, with the communication circuit 145 controlling the transfer of data between the disc 106 and the host device 141. A servo circuit controls the radial position of the head 120 through the controlled application of current to the coil 113.

FIG. 3 provides a functional block diagram of the communication circuit 145 and the servo circuit 146 of FIG. 2. The communications circuit 145 includes both a write channel (generally designated at 150) to control the storage of data to the disc 106 and a read channel (generally designated at 152) to control the retrieval of the data from the disc 106 back to the host device 141.

The write channel 150 comprises an encoder 153 which, upon receipt of data from the interface circuit 144, encodes the data with run length-limited and error correction code (ECC) encoding to facilitate clock recovery and recovered data integrity. The encoded data are provided to a write controller 154, which serializes the encoded data to generate control signals used by a preamp/driver circuit 155 to apply a time-varying write current to the head 120 to write the encoded data to the disc 106. As shown in FIG. 1, the preamp/driver circuit 155 is located within the HDA 101 and mounted to the actuator 110.

Continuing with FIG. 3, the read channel 152 receives readback signals from the head 120 which, after preamplification by the preamp/driver circuit 155, are provided by a multiplexor (MUX) 156 to an automatic gain control (AGC) circuit 157, which controllably adjusts the amplitudes of the signals to a level appropriate for remaining portions of the read channel 152.

The signals output by the AGC circuit 157 are converted to a sequence of digital samples using a flash analog-to-digital (A/D) converter 158. A finite response filter (FIR) 159 filters the digital samples to a selected class of partial-response, maximum likelihood (PRML) filtering, such as EPR-4. A Viterbi detector 160 decodes the original encoded sequence from the FIR 159 and a postcoder 161 removes the RLL encoding and applies other signal conditioning. Finally, an error correction code (ECC) circuit 162 applies on-the-fly error detection and correction to output the originally stored data to the interface circuit 144 (FIG. 2), for subsequent transfer to the host device 141.

FIG. 3 further shows the servo circuit 146 to include an AGC 164 which, like the AGC 157, controllably adjusts the amplitudes of readback servo signals read by the head 120 to a level appropriate for remaining portions of the servo circuit 146. A demodulator circuit 166 conditions the readback servo signals, including conversion to digital form, for processing by a digital signal processor (DSP) 168.

The DSP 168 controls the operation of the servo circuit 146 in response to commands issued by the system processor 142 (FIG. 2). During a track following mode of operation, the DSP 168 generates a position error signal (PES) indicative of the position of the head 120 relative to the followed track and, in response to a desired position for the head 120, outputs a current command signal to a coil driver 170 which adjusts the amount of current applied to the coil 113 to maintain the head in a desired relation with the track. During a seek, the DSP 168 applies current to the coil to first accelerate and then decelerate the head 120 from an initial track to a destination track in accordance with a velocity profile, indicative of the desired velocity trajectory for the head during the seek. Programming for the DSP 168 is provided in DSP memory (MEM) 172, including programming used to carry out a preferred embodiment of the present invention as discussed below. It will be recognized that the architecture set forth by FIG. 3 is for purposes of illustration and is not necessarily limiting to the scope of the invention as claimed hereinbelow.

Figure 4:
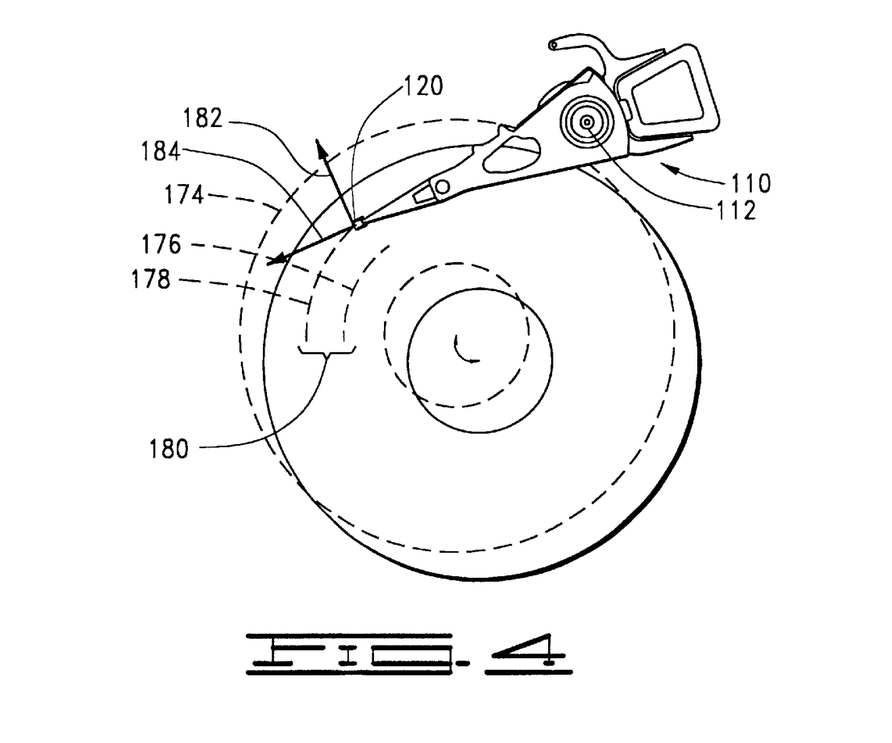
FIG. 4 shows how rotational vibration can cause head/disc displacement in the disc drive.

Having concluded the discussion of FIGS. 2–3, attention is now directed to FIG. 4 which illustrates the manner in which rotational vibration can adversely affect the operation of the disc drive 100. FIG. 4 shows a top view representation of the actuator 110 and the disc 106 of FIG. 1. More particularly, FIG. 4 shows, in exaggerated form, the resulting displacement of the disc 106 to a position 174 in response to the application of rotational vibration to the disc drive 100.

From a review of FIG. 4, it can be readily discerned that the rotational vibration causes movement of the disc drive base deck 102 (FIG. 1) about an axis normal to a plane along which the top disc 106 extends. The discs accordingly move along with the base deck 102 due to the coupling of the discs to the base deck 102 by way of the spindle motor 104 (FIG. 1). However, the actuator 110, having the capability of rotating relative to the base deck 102, acts as a free body and remains essentially stationary in space. In other words, the rotational vibration causes the discs to rotate out from underneath the actuator 110.

The resulting radial displacement of the disc 106 relative to the head 120 causes the head position to move from a first track 176 to a second track 178, with the tracks 176 and 178 separated by a distance identified at 180. As will be appreciated, such displacement can adversely affect a data transfer operation between the head 120 and the track 176; for example, should the displacement occur during a write operation, data intended to be written to the track 176 would be overwritten onto track 178, irretrievably corrupting the data stored on track 178.

In accordance with the foregoing discussion, however, it will be noted that the rotational event actually induces two separate types of motion between the head 120 and the disc 106, the first being characterized as radial in nature and the second being characterized as tangential in nature. The radial component (indicated by vector 182) generally lies along the direction of displacement of the disc 106 and primarily induces the resulting positional change from track 178 to 176. However, the tangential component (indicated by vector 184) causes a change in the rotational speed of the disc 106; that is, the rate at which the rotating disc 106 passes under the head 120 will change in relation to the magnitude of the rotational vibration event. It is to the detection of such changes in rotational speed via this tangential component 184 that the present invention (as preferably embodied herein and as claimed below) is generally directed, as will now be discussed in detail beginning with FIG. 5.

Figure 5:
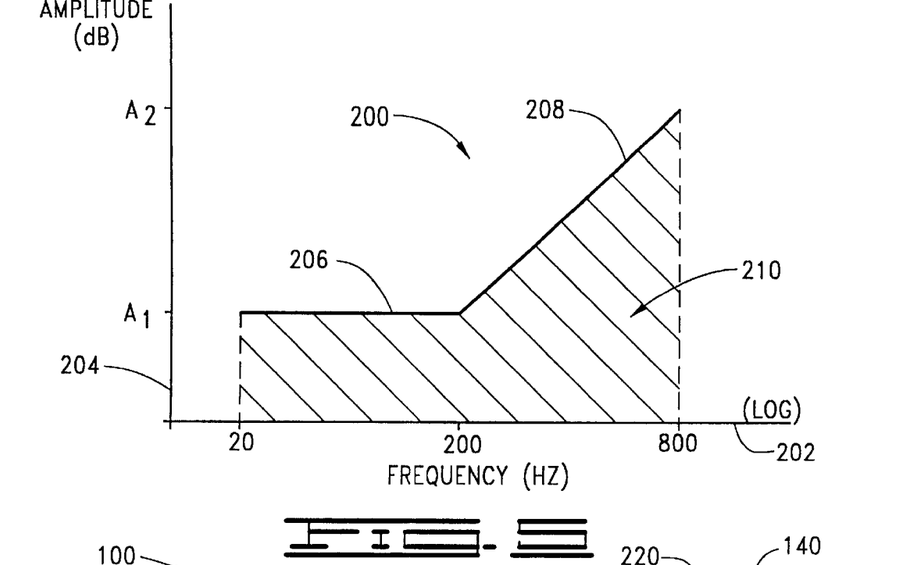
FIG. 5 provides a graphical representation of a typical rotational acceleration specification for a disc drive such as that shown in FIG. 1.

FIG. 5 shows a graphical representation of an operating curve 200 which illustrates a typical design specification for a disc drive such as at 100 in terms of the ability to reject externally applied rotational vibration. That is, a disc drive designer will typically be presented with an overall design specification (based upon customer requirements) indicative of the rotational vibration frequency and amplitude range(s) over which a resulting disc drive design must be able to operate without error. The operating curve 200 is illustrative of one such specification, and is plotted against a (log) x-axis 202 indicative of frequency and a y-axis 204 indicative of amplitude (dB).

From FIG. 5, it can be seen that the operational frequency range of interest extends from 20 hertz (Hz) to 800 Hz, with the drive 100 being required to operably reject rotational vibration below an amplitude $A_1$ from 20 Hz to 200 Hz (as indicated by segment 206), and to operably reject rotational vibration from 200 Hz to 800 Hz with the amplitude linearly increasing from amplitude $A_1$ to amplitude $A_2$ (as indicated by segment 208). Area 210, defined under the operating curve 200 and bounded by 20 Hz and 800 Hz thereby defines the rejection range wherein the drive 100 must operate error-free, and for reference preferably represents a rotational vibration of 21 radians/second$^2$ (rad/s$^2$). It will be noted that FIG. 5 has been presented merely for illustration of a typical design specification, and to point out that it is from such an initial specification that many of the parameters of the resulting compensation circuitry are preferably selected.

Figure 6:
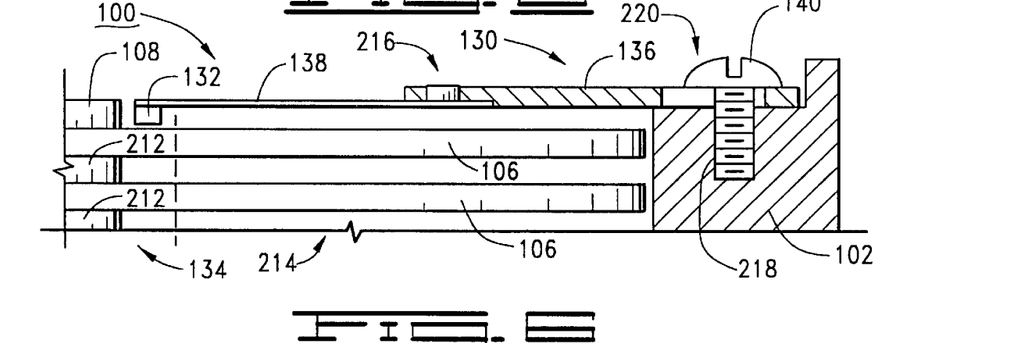
FIG. 6 shows an elevational representation of the rotational velocity sense assembly of FIG. 1.

Turning now to FIG. 6, shown therein is a partial cross-sectional, elevational representation of the sense assembly 130 of FIG. 1, in conjunction with relevant portions of the disc drive 100. Particularly, FIG. 6 shows the discs 106 of the disc drive 100 to be separated by spacers (portions of which being designated at 212), with the disc clamp 108 (also shown in FIG. 1) securing the discs 106 and spacers 212 to the hub of the spindle motor 104 (FIG. 1) in a conventional manner. As previously discussed, the fixed head 132 is radially aligned with the landing zones 126 (set forth in FIG. 6 via dotted line), with remaining portions of the surfaces of the discs 106 comprising data recording surfaces (identified generally at 214).

FIG. 6 shows the flexible suspension assembly 138 to be secured to the rigid arm 136 using a conventional swaging interconnection 216. The fastener 140 extends into a corresponding threaded hole 218 in the base deck 102 to secure the rigid arm 136 to the base deck 102. The rigid arm 136 is preferably provided with a slot 220 through which the fastener 140 extends, accommodating manufacturing tolerances during assembly. Of course, the configuration set forth in FIG. 6 is for purposes of illustrating a preferred embodiment, and is not limiting to the scope of the invention as claimed below.

Figure 7:
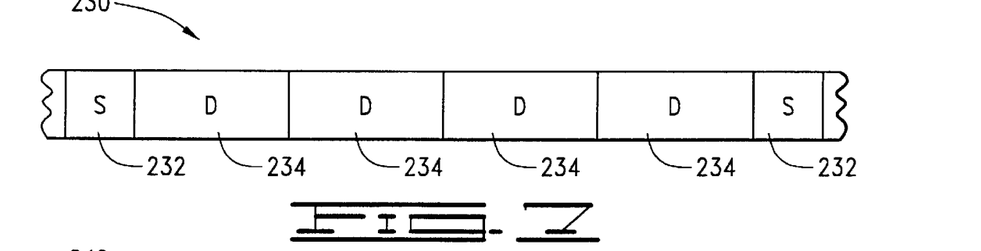
FIG. 7 provides a representation of a portion of a data recording track illustrating the manner in which servo fields are interspersed among data fields on data recording surfaces of the disc drive of FIG. 1.

The aforementioned data recording surfaces 214 of the discs 106 are used to facilitate the storage of user data and comprise a plurality of nominally concentric tracks, such as illustrated in FIG. 7. More particularly, FIG. 7 shows a portion of a track 230 comprising a plurality of servo (S) fields 232 interspersed with user data (D) fields 234. The servo fields 232 are preferably formed during a servo track write operation during manufacturing wherein a highly precise servo writer writes the servo information as a plurality of radially extending servo wedges, much like spokes of a wheel. The servo fields 232 contain servo information used to control the position of the associated data heads 120 in accordance with the discussion presented above with regarding the servo circuit 146 of FIG. 3. The data fields 234 are used to store user data supplied by the host device 141, in accordance with the discussion presented above regarding the communication circuit 145 of FIG. 3, with the data fields 234 generated during a disc drive formatting operation. For reference, the disc drive 100 preferably employs zone based recording (ZBR) so that each of the recording surfaces 214 have a plurality of nominally concentric tracks substantially similar to the track 230, with varying numbers of user data fields 234 between adjacent servo fields 232 based on radius. For a detailed discussion of ZBR techniques, see U.S. Pat. No. 4,799,112 issued Jan. 17, 1989 to Bremmer et al., assigned to the assignee of the present invention.

Figure 8:
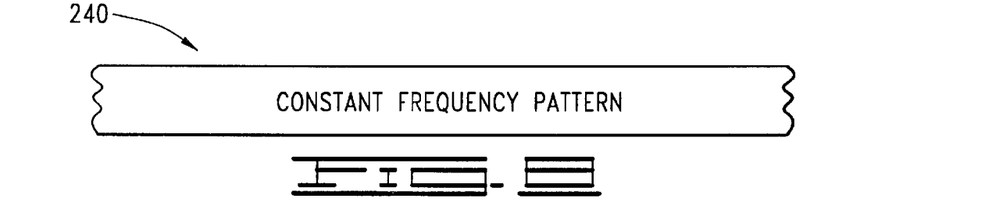
FIG. 8 provides a representation of a portion of a rotational vibration recording surface, illustrating the manner in which a constant frequency pattern (i.e., a frequency pattern written at a constant frequency) is circumferentially disposed on the landing zone in accordance with a preferred embodiment.

Unlike the recording surfaces 214, however, the landing zone 134 of the top disc 106 receives a constant frequency pattern, a portion of which is represented at 240 in FIG. 8 and which comprises a circumferentially extending pattern written at a predetermined, constant frequency. Although other patterns can be readily used as desired, a suitable pattern is a 2T pattern having a width determined substantially by the width of the write element of the fixed head 132.

In a preferred embodiment, the fixed head is characterized as a wide writer, having an effective write element width of about 0.0483 millimeters (0.0019 inches), sufficient to cover the equivalent radial width of several tracks such as the track 230 in FIG. 7. For reference, in a disc drive having a track density of about 4700 tracks/centimeter (about 12,000 tracks/inch), this would be an equivalent radial width of about 22 tracks. The read element of the fixed head 132 is contemplated as having an effective width substantially that as the effective widths of the MR read elements of the data heads 120. Thus, it will be appreciated that the effective width of the constant frequency pattern 240 of FIG. 8 may be substantially larger than the effective width of the track 230 of FIG. 7.

With regard to the constant frequency pattern 240, it will be noted that the nominal frequency at which the pattern is read back will be a function of the rotational speed of the disc 106 during such read operation. If the writing of the frequency pattern takes place while the disc 106 is rotated at the nominal operational rotational speed of the discs (such as 7200 revolutions per minute), then the nominal frequency at which the pattern is read back will generally be the same as the writing frequency (ignoring for a moment the effects of rotational vibration). It is common, however, to write certain types of information while the discs are rotated at a rotational speed that is different from the nominal operational rotational speed; for example, the servo information of the servo fields 232 can be preferably written with the discs rotating at a speed of around 1000 revolutions per minute.

Thus, it is contemplated that the frequency pattern provided to the landing zone 134 of the top disc 106 may or may not be written at the same frequency at which it is subsequently nominally read; regardless, the frequency pattern is preferably written so as to provide a readback frequency of nominally 20 megahertz (MHZ) during nominal rotational speed of the discs 106. This readback frequency can be readily modified to other suitable values, as desired, depending upon the requirements of a given application. In a preferred embodiment the constant frequency pattern 240 is initially written and used as a clock frequency to control the timing of the writing of the servo information of the servo fields 232, thereby eliminating the need to insert and position an external clock head during the servo track writing process for this purpose. This same pattern can thereafter serve as the constant frequency pattern 240 to sense rotational vibration in the disc drive 100.

At this point it will be appreciated that the disc drive 100 utilizes an embedded servo scheme to control the position of the data heads 120 using the servo information from the associated servo fields 232 (FIG. 7) on the recording surfaces 214, although the claimed invention can readily also be practiced in drives utilizing other configurations, such as a dedicated servo scheme. Regardless, the fixed head 132 will generate a separate readback signal at a frequency determined by the rate at which the landing zone 134 of the top disc 106 rotates under the head 120. As will be recognized, the disc drive 100 detects rotational vibration in relation to changes in rotational frequency of the recording surface 220.

Finally, although the configuration of FIGS. 1 and 6 places the fixed head 132 over the landing zone 134 of the top disc 106, other arrangements are explicitly contemplated and disclosed, such as the use of a different disc other than the top disc. Also, the location of the fixed head 132 can be readily selected to be elsewhere in relation to the discs 106, such as at the outermost radius, so that the constant frequency pattern 240 of FIG. 8 lies along the outermost portion of the corresponding disc 106. Those skilled in the art can readily modify the configuration set forth in FIG. 6 to accommodate such variations, making illustration in the drawings unnecessary.

It will be noted that these and other considerations are well within the scope of the invention as described herein. Nothing stated herein will be construed as supporting a view that any particular element presented herein is considered to be individually essential to the claimed invention. Rather, the contemplated scope of the invention will be wholly set forth by the subject matter of the claims; the discussion of various features, advantages and alternative configurations has been provided merely to give various illustrative, preferred examples of a few of the variety of ways whereby those skilled in the art may make and use the claimed invention.

Figure 9:
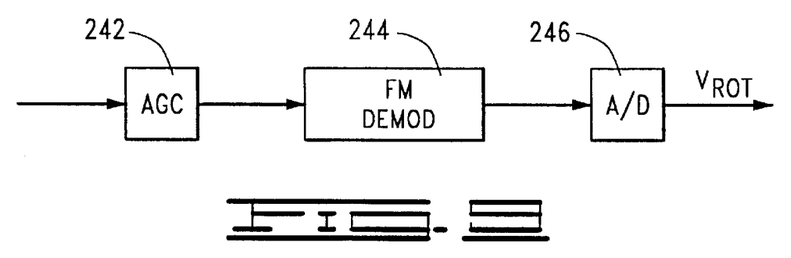
FIG. 9 provides a functional block diagram of a sense circuit which uses a frequency modulation (FM) demodulator to detect rotational vibration in relation to variations in frequency of a readback signal transduced from the constant frequency pattern of FIG. 8 in accordance with a preferred embodiment.

Referring now to FIG. 9, shown therein is additional circuitry of the disc drive 100 used in conjunction with the constant frequency pattern 240 to detect rotational vibration applied to the disc drive 100. Particularly, FIG. 9 shows an automatic gain control (AGC) circuit 242, an analog frequency modulation (FM) demodulator circuit 244 and an analog-to-digital (A/D) converter 246, constructed in accordance with a preferred embodiment and preferably located on the aforementioned disc drive PWA.

The AGC circuit 242 is operably coupled to the fixed head 132 (FIGS. 1, 6) to receive a readback signal therefrom and perform automatic gain control operations in a manner similar to those discussed above for the AGC circuits 157 and 164 of FIG. 3. Although not shown for clarity of illustration, the readback signal from the fixed head 132 is preferably preamplified by a preamplifier to provide initial preamplification of the readback signal prior to operation of the AGC circuit 242. In one preferred embodiment, the preamp/driver 155 (FIG. 3) is operably configured to pass readback signals from both the fixed head 132 and the data heads 120; in another preferred embodiment, a separate preamplifier is dedicated for use by the sense head 132 to facilitate the writing and subsequent reading of the constant frequency pattern 240. This separate preamplifier, omitted from the drawings for clarity, can be preferably disposed on the disc drive PWA, or located within the HDA 101, as desired. The need and extent of such preamplification, of course, will depend upon the requirements of a given application.

Continuing with FIG. 9, the output from the AGC circuit 242 is supplied to the FM demodulator 244, which outputs an analog signal having a magnitude that changes in relation to changes in frequency in the input signal. For reference, a particularly suitable FM demodulator is the MC3362 supplied by Motorola, Inc. of Phoenix, Ariz., U.S.A.

The output frequency demodulated signal is next passed through the A/D 246 to provide a corresponding digital signal output (i.e., sequence of digital samples) of rotational velocity, denoted as "$V_{ROT}$." As described more fully below, the disc drive 100 monitors the magnitude of the $V_{ROT}$ signal and temporarily interrupts a data transfer operation when this magnitude exceeds a predetermined threshold.

Figure 10:
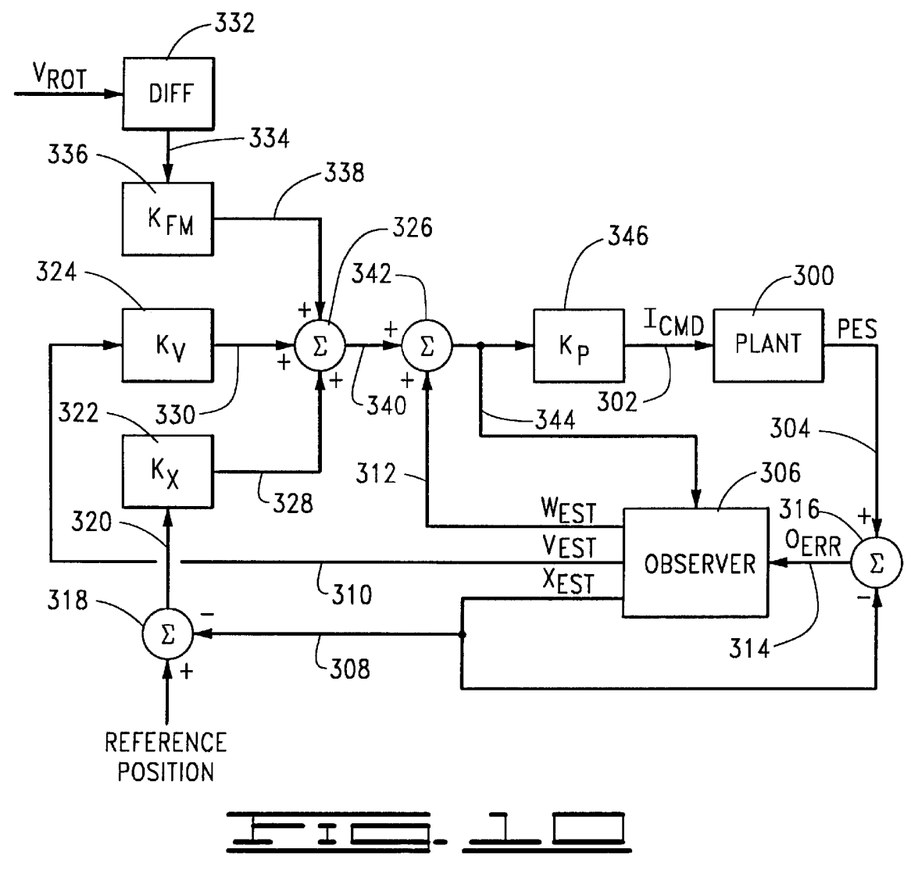
FIG. 10 is a control block diagram representative of the disc drive, illustrating the manner in which the servo circuit of the disc drive uses a rotational velocity signal generated from the FM demodulator of FIG. 9 to minimize the effects of rotational vibration in accordance with a preferred embodiment.

Referring now to FIG. 10, shown therein is a block diagram representation of the operation of the servo circuit 146 in accordance with a preferred embodiment. More particularly, the block diagram representation includes modules existing in programming stored in memory 172 (FIG. 3) and utilized by the DSP 168 in providing positional control while minimizing the effects of rotational vibration upon the drive.

As shown in FIG. 10, a plant block 300 is presented representative of selected electrical and mechanical aspects of the disc drive 100. For reference, the plant 300 generally corresponds to portions of the servo loop established by the servo circuit 146 (see FIG. 3). The plant block 300 receives as an input a current command ($I_{CMD}$) signal on path 302 and, in response, outputs a position error signal (PES) on path 304 indicative of positional error in the selected data head 120.

FIG. 10 further shows an observer block 306, which generally provides a mathematical model of the plant 300 and periodically outputs estimates of head position ($X_{EST}$), velocity ($V_{EST}$) and bias ($W_{EST}$) on paths 308, 310 and 312, respectively. Bias will be understood as being indicative of forces that tend to move the heads away from a selected position, such as spring forces applied by the flex circuit 122 (FIG. 1) and windage effects caused by air currents set up by the rotation of the discs 106. The estimates output by the observer 306 are formed in relation to an observer error ($O_{ERR}$) signal on path 314 generated by a summing junction 316 as the difference between the PES and the $X_{EST}$.

The $X_{EST}$ on path 308 is further summed at a summing junction 318 with a reference position (indicative of desired head position) and the output on path 320 is applied to a position gain block 322 having gain $K_X$. The $V_{EST}$ on path 310 is similarly applied to a velocity gain block 324 having gain $K_V$. The outputs of the position and velocity gain blocks 322, 324 are brought to a summing junction 326 by way of paths 328, 330, respectively.

The manner in which the $V_{ROT}$ signal (FIG. 9) is preferably used to control head position (i.e., control the amount of current applied to the coil 113), thereby minimizing the effects of rotational vibration applied to the disc drive 100, will now be discussed. Particularly, FIG. 10 shows the $V_{ROT}$ signal being applied to a differentiator block 332, which differentiates the $V_{ROT}$ signal to provide an acceleration signal on path 334 to a gain block 336 having a gain $K_{FM}$. The gain $K_{FM}$ is preferably selected in a manner to be discussed below, but generally is set to a value that maximizes the ability of the servo circuit 146 to compensate for the effects of rotational vibration on the disc drive 100. The output of the gain block 336 is provided on path 338 and is likewise summed by the summing junction 326.

The output of the summing junction 326 is provided along path 340 to a summing junction 342, which further receives the $W_{EST}$ from the observer 306 on the path 312. The resulting signal, impressed on path 344, is generally proportional to the current to be applied to the coil 113 and is provided to the observer 306 as shown. To maintain the operation of the observer 306 nominally that of the plant 300, however, the signal of path 344 is finally passed through a gain block 346 with gain $K_P$ to generate the aforementioned current command signal $I_{CMD}$.

Figure 11:
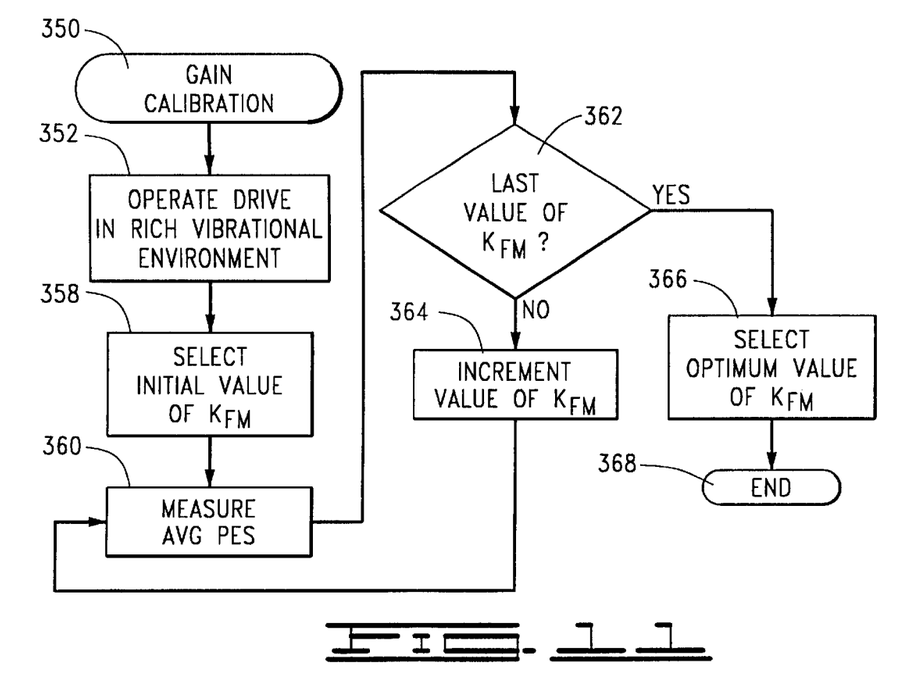
FIG. 11 provides a generalized flow chart for a GAIN CALIBRATION routine, performed to select an optimum value for the $K_{FM}$ gain utilized by the control block diagram of FIG. 10 in accordance with a preferred embodiment.

To present a preferred method for setting the gain $K_{FM}$ of the gain block 336 to an optimum value, FIG. 11 has been provided which shows a general flow chart for a GAIN CALIBRATION routine 350, carried out in accordance with a preferred embodiment of the present invention. The routine of FIG. 11 generally corresponds to programming stored in DSP memory 172 and utilized by the DSP 168. It is contemplated that the routine will be carried out during disc drive manufacturing, but can also be subsequently carried out during data processing use of the disc drive 100 (i.e., by an end-user of the drive).

As shown at step 352, the disc drive 100 is first placed and operated within a rich vibrational environment, wherein a broad spectrum of translational and rotational vibrational components is applied to the disc drive 100. Such an environment is shown schematically in FIG. 12.

Figure 12:
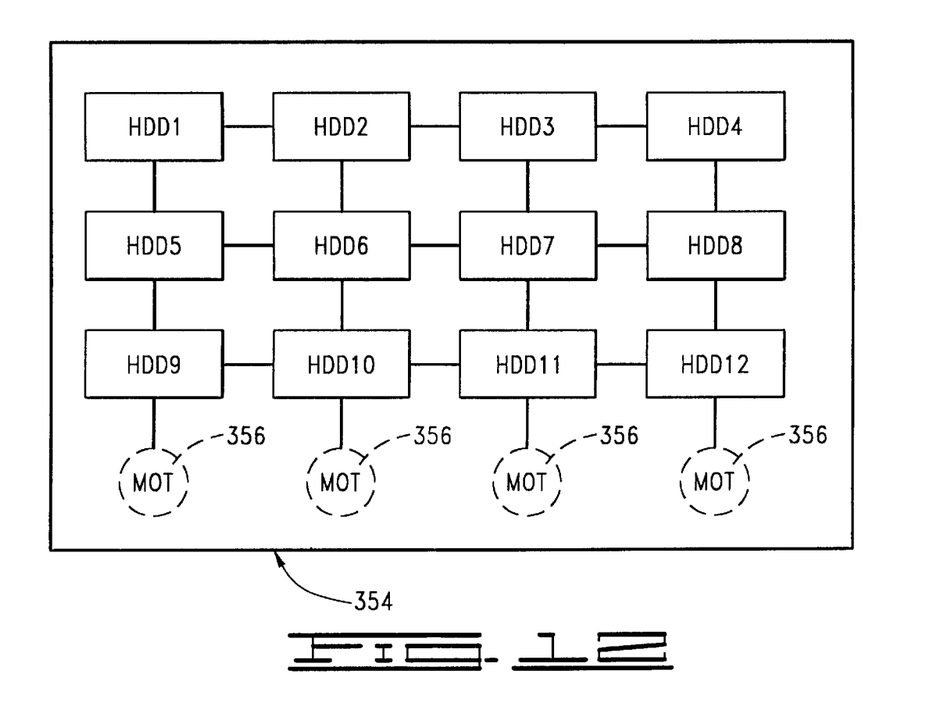
FIG. 12 illustrates an enclosure housing a plurality of mechanically intercoupled disc drives used to generate a rich vibrational environment for the disc drive of FIG. 1.

More particularly, FIG. 12 illustrates an enclosure 354 housing a plurality of hard disc drives (12 in this example, identified as HDD1–HDD12) nominally identical to the disc drive 100 of FIG. 1. The disc drives are mechanically coupled together in such a manner so as to maximize transfer of vibrational components from drive to drive during operation. The enclosure 354 can correspond to an environmental chamber used to perform manufacturing dynamic burn-in (DBI) testing wherein the drives are operated over an extended period of time (such as 48 hours) while being subjected to a variety of environmental conditions, such as different temperatures, ambient pressures, etc. Alternatively, the enclosure 354 can correspond to a RAID housing so that the disc drives form a multi-drive array and are operated as a single data storage system.

A plurality of mechanical vibration sources 356 such as motors ("MOT") can also be coupled to the disc drives, as shown in FIG. 8. These vibration sources 356 inject additional amounts of vibration into the disc drives, and can represent cooling fans used to enhance convective cooling of the drives (such as commonly used in RAID housings); alternatively, when the routine of FIG. 11 is carried out during DBI, the vibration sources 356 can be motors that are specifically placed within the environmental chamber.

Returning to FIG. 11, the routine next proceeds to identify an optimum value for the gain $K_{FM}$ which results in a minimum average PES magnitude; in other words, the optimum gain setting for $K_{FM}$ minimizes the effects of vibration on head position, as reflected by PES magnitude. This is preferably accomplished by first setting the gain $K_{FM}$ to an initial value, as indicated by step 358, measuring the average PES magnitude, step 360, and repeating for each new increment of $K_{FM}$, as indicated by decision step 362 and step 364. Steps 358, 360, 362 and 364 accordingly comprise a sweep of the gain $K_{FM}$ from its minimum to maximum value while measuring the average PES magnitude for each increment, using an accumulation function or other suitable methodology to capture the average PES in each case. The optimum value of $K_{FM}$ is next selected at step 366 in relation to the value that provided the minimum average PES magnitude, and this optimum value is thereafter used by the gain block 336 (FIG. 10) until the next execution of the routine of FIG. 11. Once the optimum value is selected, the routine ends at step 368.

The routine of FIG. 11 thus presents an efficient methodology for determining the optimum value for the gain $K_{FM}$ and presents several advantages over the prior art. For example, unlike conventional prior art approaches, it is wholly unnecessary to place the disc drive 100 onto a shaker table in order to apply carefully controlled amounts of vibration to the drive; instead, the routine can be carried out during existing conventionally applied manufacturing steps (such as DBI) with little or no modification to the test routine. The rich vibrational environment used to calibrate the gains during manufacturing (i.e., multi-drive DBI chamber) will often be representative of the actual operational environment in which the drive will ultimately be operated, ensuring better correlation between the routine and actual field use.

Moreover, the adaptive capabilities of the routine of FIG. 11 allow the disc drive 100 to further optimize the gains in relation to the vibrations experienced in each particular operational environment. For example, it is contemplated that the routine of FIG. 11 can be performed by the disc drive during field use on a periodic basis to maintain optimal performance of the drive. The routine can also be specifically performed by the drive after the occurrence of a sufficient number of off-track faults, in an effort to better optimize present settings of the drive. Further, although actuators (such as 110) are intended to be nominally balanced so that translational vibration will have minimal effect upon drive operation, in practice some amount of imbalance will exist. Accordingly, the adaptive characteristics of the disc drive 100 result in compensation for the effects of actuator imbalance, an important advantage not found in the prior art.

Figure 13:
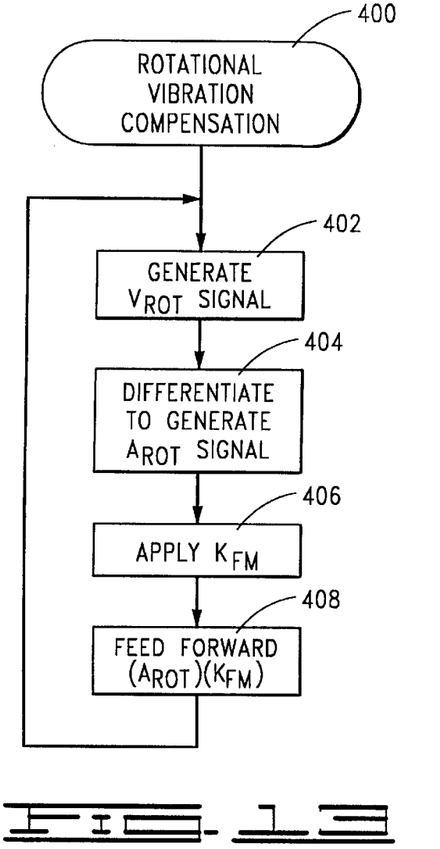
FIG. 13 provides a generalized flow chart for a ROTATIONAL VIBRATION COMPENSATION routine, representative of the operation of the disc drive in minimizing the effects of rotational vibration during operation in accordance with a preferred embodiment.

Having completed the foregoing discussion of the manner in which the gain $K_{FM}$ is preferably selected to minimize the effects of rotational vibration, reference is now made to FIG. 13 which sets forth a generalized flow chart for a ROTATIONAL VIBRATION COMPENSATION routine 400, carried out in accordance with a preferred embodiment during operation of the disc drive. The routine of FIG. 13 is preferably performed in conjunction with other normal disc drive operational routines.

Once the $K_{FM}$ gain is properly calibrated, the fixed head 132 continually presents the $V_{ROT}$ signal as discussed above. Each time one of the data heads 120 is caused to follow a selected track (such as 230, FIG. 7) on the corresponding recording surface 214, the fixed head 132, as enabled, will transduce the constant frequency pattern from the landing zone 126 and output the $V_{ROT}$ signal, which will have a magnitude that changes in relation to changes in the rotational speed of the disc 106. This operation is generally set forth by step 402 in FIG. 13.

Next, the $V_{ROT}$ signal is differentiated to generate the aforementioned acceleration signal, denoted in step 404 of FIG. 13 as $A_{ROT}$. A preferred method for performing this operation was previously discussed with regard to the differentiator block 332 of FIG. 10. It will be noted that during normal operation of the disc drive 100, in the general absence of rotational vibration (and negligible amounts of spindle motor speed variation), the $A_{ROT}$ signal will be nominally zero, and accordingly have an insignificant effect upon the operation of the servo circuit 146.

The gain $K_{FM}$ is next applied to the $A_{ROT}$ signal, step 406 of FIG. 11, as shown by the gain block 336 of FIG. 10. The resulting product $(A_{ROT})(K_{FM})$ is then fed forward into the servo loop, step 408 of FIG. 11, at the summing junction 326 of FIG. 10, to minimize the effects of rotational vibration upon the disc drive 100. The routine of FIG. 13 loops back as shown, thereby continuing in like manner during operation of the drive.

Figure 14:
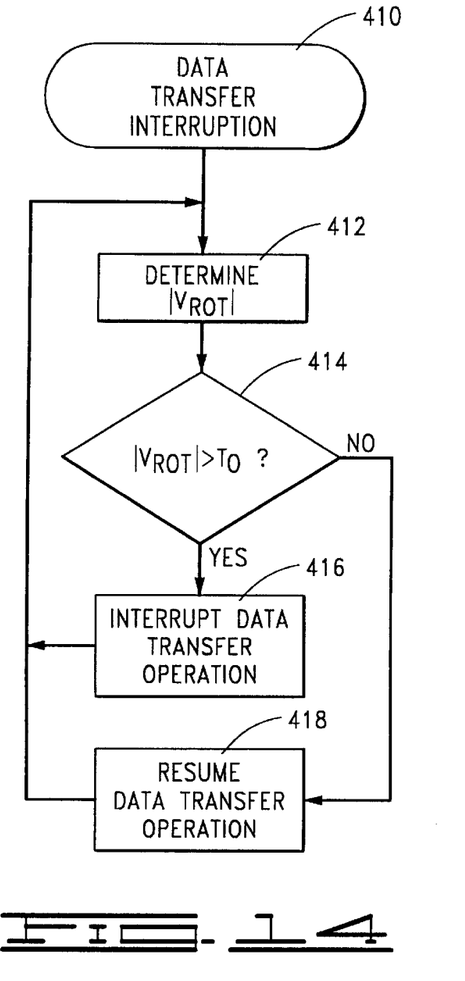
FIG. 14 is a generalized flow chart for a DATA TRANSFER INTERRUPTION routine, representative of the operation of the disc drive to temporarily interrupt a data transfer operation when detected rotational vibration exceeds an acceptable level as quantified by a predetermined threshold in accordance with a preferred embodiment.

FIG. 14 provides a flow chart for an additional level of programming utilized by the disc drive 100, namely a DATA TRANSFER INTERRUPTION routine 410, which like the routine of FIG. 13, operates in conjunction with other normal disc drive operational routines. However, unlike the ROTATIONAL VIBRATION COMPENSATION routine of FIG. 13 which operates to minimize acceptable levels of rotational vibration (such levels being within the area 210 of FIG. 5), the DATA TRANSFER INTERRUPTION routine of FIG. 14 additionally detects rotational vibration events that exceed the operating curve 200 of FIG. 5, and temporarily halts data transfer to prevent the unintended overwriting or misreading of data to or from the discs 106.

As shown at step 412, the routine of FIG. 14 determines the absolute magnitude of each $V_{ROT}$ signal sample. Each such magnitude is compared to an operational threshold ($T_O$) which corresponds to a maximum acceptable level of rotational acceleration. Consonant with the foregoing discussion of FIG. 5, it will be understood that the threshold $T_O$ can be made a single value, or can alternatively vary with regard to the frequency content of the $V_{ROT}$ signal samples, as desired, to more closely correspond to the operational parameters of FIG. 5.

Regardless, when the magnitude of the $V_{ROT}$ signal exceeds the operational threshold (decision step 414), the flow passes to step 416 wherein the servo circuit 146 temporarily interrupts any data transfer operations of the disc drive 100, until such time that the rotational acceleration is brought back within an acceptable level (as indicated by step 418). In another preferred embodiment, the $V_{ROT}$ signal is integrated to generate a running position estimate, which can likewise be monitored to detect rotational vibration in relation to the magnitude of the position estimate, with data transfer operations being interrupted accordingly. Such integration can be reset upon receipt of each true sample of servo information (i.e., passage of each successive servo field 232 under the selected head 120).

As mentioned above, in a preferred embodiment the circumferentially extending frequency pattern 240 (FIG. 8) is further used to clock the writing of the servo information of the servo fields 232 (FIG. 7) during a servo track writing (STW) process performed during disc drive manufacturing. The significance of this capability can be understood with a brief review of a typical prior art STW process.

It will be recognized that timing information is necessary to properly locate and align the servo fields (such as 232) on a pristine disc. Such timing information is typically provided in the form of a clock signal generated by an externally supplied clock head which is inserted through an opening in the housing of an HDA (this opening is subsequently sealed).

For example, the clock head can be mounted to a pneumatically controlled arm which is used to control the position of the head. Once the HDA is mounted on an appropriate fixture of a STW station, the arm pivots the clock head into position over the outermost radius of a selected disc at a position beyond the data recording surface of the disc. In such a configuration, a pneumatic "ram" can be used to adjust the height of the clock head to an appropriate elevation over the disc.

Once the clock head is properly located, it commences to write a clock pattern at a predetermined frequency. The clock head subsequently generates a readback signal from the clock pattern, with the readback signal being provided to a phase locked oscillator (PLO) circuit so that the frequency of the readback signal locks the frequency of the PLO. The PLO is then used to control the timing of the writing of the servo fields. For reference, a second opening is typically provided through the housing to allow a pusher pin or similar element to mechanically advance the actuator across the surfaces of the discs to write the servo information. A closed loop positioning system (typically laser based) detects and controls the radial advancement of the actuator.

Although operative, this prior art methodology, as well as other similar methodologies, results in several disadvantages. For example, the time required to insert and align the external clock head can be substantial, especially in a high volume production environment; as each HDA is subjected to the STW process in order to receive the requisite servo information, the STW process can potentially provide an undesirable "bottleneck" in the manufacturing process. Moreover, there is a risk of damage to the surfaces of the disc due to improper positioning of the clock head, as well as a risk of particulate contamination through the opening required to accommodate the external clock head (e.g., debris, through head contamination or tribology, can be passed along to several drives from the same clock head). In certain cases, vibration generated by the rotation of the discs can induce resonances which can be transmitted through the pneumatic arm to the externally mounted clock head, potentially introducing errors in the servo information written to the discs.

The aforementioned fixed head 132 (FIG. 1), however, favorably overcomes these and other disadvantages with prior art STW methodologies, by providing a source internal to the HDA for the timing information necessary to write the servo information. Eliminating the need for an external clock head can accordingly simplify the STW process and improve manufacturing yields and throughput.

In view of the foregoing discussion, it will now be clear that the present invention is directed to a method and apparatus for minimizing the effects of rotational vibration on a disc drive. As exemplified by preferred embodiments, the disc drive (100) comprises a base deck (102) supporting a rotatable disc (106) and an actuator (110) having a moveable data head (120).

A fixed head (132) is supported over the disc at a predetermined radius of the disc, and generates a readback signal from a circumferentially extending frequency pattern (240) written to the disc at a constant frequency. An FM demodulator (244) generates a rotational velocity signal indicative of application of rotational vibration to the base deck in relation to changes in frequency of the readback signal from the fixed head induced by changes in rotational speed of the disc. A servo circuit (146) controllably positions the moveable data head in response to servo information (232) stored on the disc and the rotational velocity signal from the FM demodulator.

The servo circuit further interrupts a data transfer operation (step 416) between the moveable data head and a host device (141) when a magnitude of the rotational velocity signal exceeds a predetermined threshold (step 414).

In a preferred embodiment, the disc further comprises a landing zone (126) on which the moveable data head is brought to rest when the disc drive is deactivated, the circumferentially extending frequency pattern is written to the landing zone, and the fixed head is supported over the landing zone.

For purposes of the appended claims, the terms "circuit" and "block" will be understood to be realizable in either hardware or software, in accordance with the foregoing discussion. The phrase "circumferentially extending frequency pattern written at a constant frequency" and similar such phrases will be understood, consistently with the foregoing discussion, to describe a pattern that extends substantially all the way around the disc at each selected radius, such as illustrated for the landing zone 134 of the top disc 106, although the scope of the claims is not so limiting to such disc radial location. The phrase "FM demodulator" will be interpreted consistent with the foregoing discussion to describe a device which outputs a signal having an amplitude in relation to changes in input frequency. Although method steps have been set forth in a particular order, such ordering is not necessarily limiting to the scope of the claims.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a disc drive having a rotary actuator supporting a moveable data head adjacent a rotatable disc, the actuator and the disc supported by a base deck, an apparatus for minimizing effects of rotational vibration applied to the base deck, comprising:

a fixed head, supported over the disc at a predetermined radius of the disc, which generates a readback signal from a circumferentially extending frequency pattern written to the disc at a constant frequency, the fixed head remaining at the predetermined radius irrespective of movement of the data head by the actuator;

a frequency modulation (FM) demodulator, operably coupled to the fixed head, which generates a rotational velocity signal indicative of application of rotational vibration to the base deck in relation to changes in frequency of the readback signal from the fixed head induced by changes in rotational speed of the disc; and a servo circuit, operably coupled to the moveable data head and the FM demodulator, which controllably positions the moveable data head in response to servo information stored on the disc and the rotational velocity signal from the FM demodulator.

2. The apparatus of claim 1, wherein the disc further comprises a landing zone on which the moveable data head is brought to rest when the disc drive is deactivated, wherein the circumferentially extending frequency pattern is written to the landing zone, and wherein the fixed head is supported over the landing zone.

3. The apparatus of claim 1, wherein the servo circuit interrupts a data transfer operation between the moveable data head and a host device associated with the disc drive when a magnitude of the rotational velocity signal exceeds a predetermined threshold.

4. The apparatus of claim 1, further comprising:

a gain block, operably coupled to the FM demodulator, which applies a gain to the rotational velocity signal to generate an adjusted rotational velocity signal; and a differentiator block, operably coupled to the gain block, which differentiates the adjusted rotational velocity signal to generate a rotational acceleration signal indicative of a tangentially directed acceleration component of the rotational vibration applied to the base deck.

5. The apparatus of claim 4, wherein the actuator further supports a magnetic coil and wherein the servo circuit uses the rotational acceleration signal to generate a current command signal indicative of current applied to the magnetic coil to position the moveable data head.

6. The apparatus of claim 4, wherein the servo circuit selects the gain to minimize error in the positioning of the moveable data head induced by the application of rotational vibration to the base deck.

7. The apparatus of claim 4, wherein the servo circuit comprises a processor having associated programming to:

set the gain to an initial value; and selectively vary the value of the gain while measuring an average position error signal indicative of error in the positioning of the moveable data head to identify an optimum value of the gain.

8. The apparatus of claim 7, wherein the optimum gain is selected while the disc drive is operated in a rich vibrational environment wherein both rotational and translational vibration components are imparted to the disc drive.

9. The apparatus of claim 8, wherein the disc drive is mechanically coupled to a plurality of additional disc drives so that at least portions of the rotational and translational components are established by the operation of the additional disc drives.

10. The apparatus of claim 1, wherein the readback signal generated by the fixed head further provides timing information used to write the servo information to the disc.

11. A disc drive, comprising:

a base deck supporting a rotatable disc and an actuator having a moveable data head;

a fixed head, supported over the disc at a predetermined radius of the disc, which generates a readback signal from a circumferentially extending frequency pattern written to the disc at a constant frequency, the fixed head remaining at the predetermined radius irrespective of movement of the data head by the actuator;

a frequency modulation (FM) demodulator, operably coupled to the fixed head, which generates a rotational velocity signal indicative of application of rotational vibration to the base deck in relation to changes in frequency of the readback signal from the fixed head induced by changes in rotational speed of the disc; and a servo circuit, operably coupled to the moveable data head and the FM demodulator, which controllably positions the moveable data head in response to servo information stored on the disc and the rotational velocity signal from the FM demodulator.

12. The disc drive of claim 10, wherein the disc further comprises a landing zone on which the moveable data head is brought to rest when the disc drive is deactivated, wherein the circumferentially extending frequency pattern is written to the landing zone, and wherein the fixed head is supported over the landing zone.

13. The disc drive of claim 11, wherein the servo circuit interrupts a data transfer operation between the moveable data head and a host device associated with the disc drive when a magnitude of the rotational velocity signal exceeds a predetermined threshold.

14. The disc drive of claim 11, wherein the constant frequency pattern is used to write the servo information to the disc.

15. A method for minimizing effects of rotational vibration on a disc drive comprising a base deck supporting a rotatable disc and an actuator having a moveable data head, comprising steps of:

(a) operating the disc drive in a rich vibrational environment wherein both rotational and translational vibration components are imparted to the disc drive;

(b) using a fixed head supported over the disc at a predetermined radius of the disc to generate a readback signal from a circumferentially extending frequency pattern written to the disc at a constant frequency, the fixed head remaining at the predetermined radius irrespective of movement of the data head by the actuator;

(c) applying frequency demodulation to the readback signal to derive a rotational velocity signal indicative of application of rotational vibration to the base deck in relation to changes in frequency of the readback signal; and (d) controlling the position of the moveable data head in relation to the rotational velocity signal and servo information readback by the moveable data head.

16. The method of claim 15, further comprising a step of:

(e) interrupting a data transfer operation between the moveable data head and a host device associated with the disc drive when a magnitude of the rotational velocity signal exceeds a predetermined threshold.

17. The method of claim 15, wherein the controlling step (d) further comprises steps of:

(d1) applying a gain to the rotational velocity signal to generate an adjusted rotational velocity signal;

(d2) differentiating the adjusted rotational velocity signal to generate a rotational acceleration signal indicative of a tangentially directed acceleration component of the rotational vibration applied to the base deck; and (d3) using the rotational acceleration signal to generate a current command signal which controls a magnitude of current applied to a coil of the actuator to control the position of the moveable data head.

18. The method of claim 17, wherein the controlling step (d) further comprises steps of:

(d4) setting the gain to an initial value;

(d5) selectively varying the value of the gain while measuring an average position error signal indicative of error in the positioning of the moveable data head to identify an optimum value of the gain; and (d6) using the optimum value of the gain in the applying step (d1).

19. The method of claim 15, wherein the operating step (a) further comprises mechanically coupling the disc drive to a plurality of additional disc drives so that at least portions of the rotational and translational components are established by operation of the additional disc drives.

* * * * *